United States Patent [19]

Ogawa

[11] Patent Number: 5,060,784
[45] Date of Patent: Oct. 29, 1991

[54] TORSION SPRING CONVEYING AND SEPARATING SYSTEM

[75] Inventor: Masazumi Ogawa, Kanagawa, Japan

[73] Assignee: Fuji Photo Film Co., Ltd., Kanagawa, Japan

[21] Appl. No.: 598,523

[22] Filed: Oct. 16, 1990

[30] Foreign Application Priority Data

Oct. 19, 1989 [JP] Japan .................................. 1-272221

[51] Int. Cl.$^5$ ............................................ B65G 47/00
[52] U.S. Cl. ................................ 198/468.4; 198/771; 221/200; 221/236; 221/239
[58] Field of Search ................... 198/468.4, 463.4, 771; 221/200, 236, 239

[56] References Cited

U.S. PATENT DOCUMENTS

| | | | |
|---|---|---|---|
| 3,972,408 | 8/1976 | Seragnoli | 198/463.4 X |
| 4,524,596 | 6/1985 | Tsunekawa et al. | 72/133 |
| 4,744,455 | 5/1988 | Dragotta et al. | 198/468.4 X |
| 4,927,001 | 5/1990 | Hendricks | 198/771 X |

Primary Examiner—Joseph E. Valenza
Assistant Examiner—Cheryl L. Gastineau
Attorney, Agent, or Firm—Sughrue, Mion, Zinn, Macpeak & Seas

[57] ABSTRACT

An α-shaped torsion springs having a cylindrical coiled portion and first and second leg portions projecting from opposite ends of the coiled portion is conveyed along a conveyor rail. The conveyor rail has a base wall, first and second side wall which project upward on opposite sides of the base wall and extend in parallel to each other, a coil support surface which projects horizontally above the base wall from the second side wall toward the first side wall and terminates at a free edge spaced from the first side wall, and a partition wall which projects horizontally above the base wall from the first side wall toward the second side wall and terminates near the free edge of the coil support surface above the same. The α-shaped torsion spring is conveyed along the conveyor rail with the coiled portion resting on the coil support surface in a vertical position, the first leg portion projecting above the partition wall and the second leg portion projecting below the partition wall and being spaced from the base wall. The edge of the partition wall opposed to the second side wall prevents the leg portions from interfering with the first side wall during conveyance.

4 Claims, 6 Drawing Sheets

TORSION SPRING CONVEYING AND SEPARATING SYSTEM

BACKGROUND OF THE INVENTION

1. Field of the Invention

This invention relates to a system for conveying a plurality of α-shaped torsion springs and separating the torsion springs one by one.

2. Description of the Prior Art

As shown in FIG. 8, an α-shaped torsion spring comprises a coiled portion 2 and a pair of leg portions 3a and 3b. Such α-shaped torsion springs 1 are used in various products. Various systems have been developed in order to convey a plurality of α-shaped torsion springs to a predetermined position and separate them one by one when incorporating the α-shaped torsion spring into a work.

In a common torsion spring conveying and separating system shown in FIGS. 9 and 10, the α-shaped torsion springs 1 are first arranged by means of a vibrating bowl feeder (not shown) in a row with the coiled portion 2 of each α-shaped torsion spring 1 extending vertical and the leg portions 3a and 3b projecting in the respective predetermined directions, and then are conveyed to a chucking position by means of a linear vibrating feeder 4. The linear vibrating feeder 4 comprises a conveyor rail 5 which is substantially U-shaped in cross-section. A narrow groove 6 is formed in the bottom of the rail 5 and each α-shaped torsion spring 1 is conveyed along the rail 5 in the direction of arrow A while the position of the spring 1 is regulated by the leg portion 3b fitted in the groove 6. The α-shaped torsion spring 1 is stopped when it abuts against a stopper 7 formed on the front end of the rail 5. A chucking device comprising a center pin 8a and a chucking claw 8b is disposed above the coiled portion 2 of the leading α-shaped torsion spring 1. The center pin 8a and the chucking claw 8b are moved downward so that the center pin 8a enters the hole 2a of the coiled portion 2, and then the chucking claw 8b is moved toward the coiled portion 2 through a passage 9 formed in a side wall 5a of the rail 5, whereby the leading spring 1 is caught between the center pin 8a and the chucking claw 8b. Then when the chucking device is moved upward, the leading spring 1 is separated from the other springs.

However since the leg portions 3a and 3b keep curl of the wire of which the α-shaped torsion spring 1 has been formed, the leg portion 3b is apt to project out of the groove 6 during conveyance by the linear vibrating feeder 4 to catch another spring or to get out of the groove 6 to move the spring 1 out of the predetermined position, whereby the feeder 4 can get jammed.

When a winding machine is incorporated with a system for incorporating the spring into a work and the spring formed by the winding machine is directly incorporated into the work as disclosed, for instance, in U.S. Pat. No. 4,524,596, the system for conveying the spring can be eliminated. But this approach is disadvantageous in that when the winding machine having a complicated mechanism is incorporated with the system for incorporating the spring into a work, maintenance cost is substantially increased and maintenance of the system takes an expert operator.

SUMMARY OF THE INVENTION

In view of the foregoing observations and description, the primary object of the present invention is to provide a torsion spring conveying and separating system which is simple in structure and can feed the α-shaped torsion springs at high efficiency without getting jammed.

In accordance with the present invention, there is provided a torsion spring conveying and separating system comprising a linear vibrating feeder which conveys a plurality of α-shaped torsion springs along a conveyor rail extending in a predetermined direction and an escapement mechanism which separates the leading one of the α-shaped torsion springs from the trailing ones at the front end of the conveyor rail, each of the α-shaped torsion springs having a cylindrical coiled portion and first and second leg portions projecting from opposite ends of the coiled portion, said torsion spring conveying and separating system characterized in that said conveyor rail comprises a base wall portion extending horizontally in said predetermined direction, first and second side wall portions which project upward on opposite sides of the base wall portion and extend in the predetermined direction substantially in parallel to each other, a coil support surface which projects horizontally above the base wall portion from the second side wall portion toward the first side wall portion and terminates at a free edge spaced from the first side wall portion, and a partition wall portion which projects horizontally above the base wall portion from the first side wall portion toward the second side wall portion and terminates near the free edge of the coil support surface above the same, said α-shaped torsion spring being conveyed along the conveyor rail with the coiled portion resting on the coil support surface in a vertical position, the first leg portion projecting above the partition wall portion and the second leg portion projecting below the partition wall portion and being spaced from the base wall portion, the edge of the partition wall portion opposed to the second side wall portion preventing the leg portions from interfering with the first side wall portion during conveyance, and said escapement mechanism comprises an escape pin member which is inserted into the coiled portion of the leading one of the α-shaped torsion springs conveyed along the conveyor rail and a suction means which holds the second leg portion of the leading one of the α-shaped torsion springs under suction force, the escape pin member and the suction means being movable together with each other in the predetermined direction to draw forward the leading one of the α-shaped torsion springs, thereby separating it from the trailing α-shaped torsion springs.

DESCRIPTION OF THE PREFERRED EMBODIMENT

Figure 8:
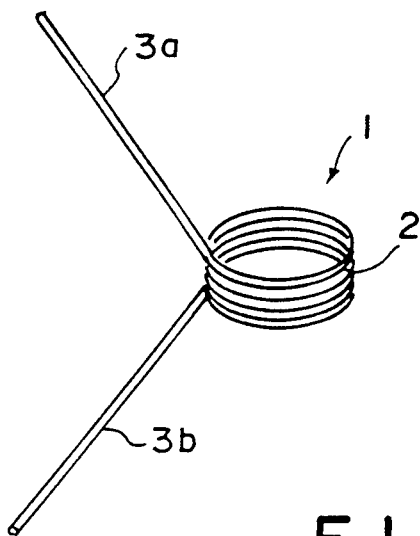
FIG. 8 is a perspective view showing an example of an α-shaped torsion spring.
Figure 10:
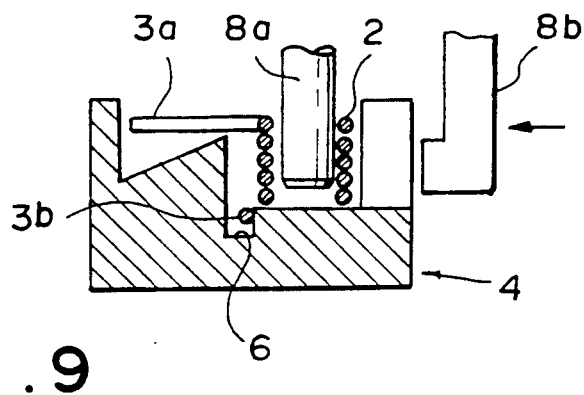
FIG. 10 is a fragmentary cross-sectional view of the conventional system.
Figure 9:
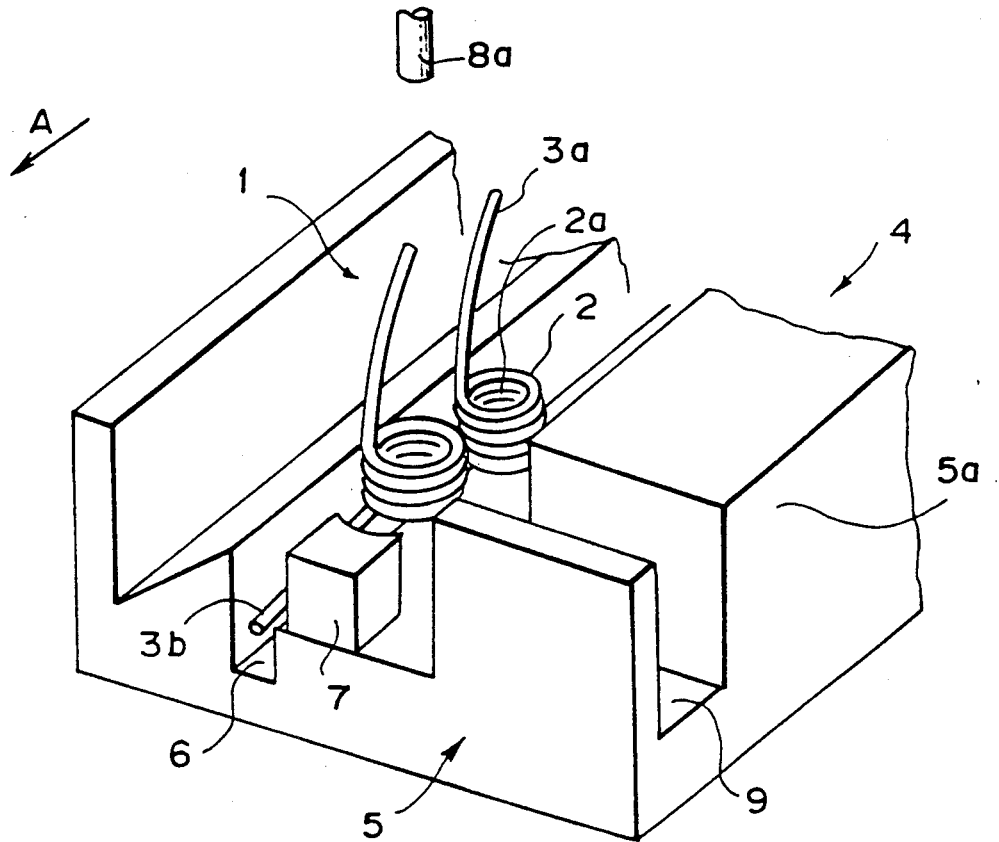
FIG. 9 is a fragmentary perspective view showing a conventional torsion spring conveying and separating system.

A torsion spring conveying and separating system in accordance with an embodiment of the present invention which is for conveying the α-shaped torsion spring 1 shown in FIG. 8 in a step of incorporating the spring 1 into a brake portion of a lower half of a videotape cassette (not shown) will be described, hereinbelow.

Figure 1:
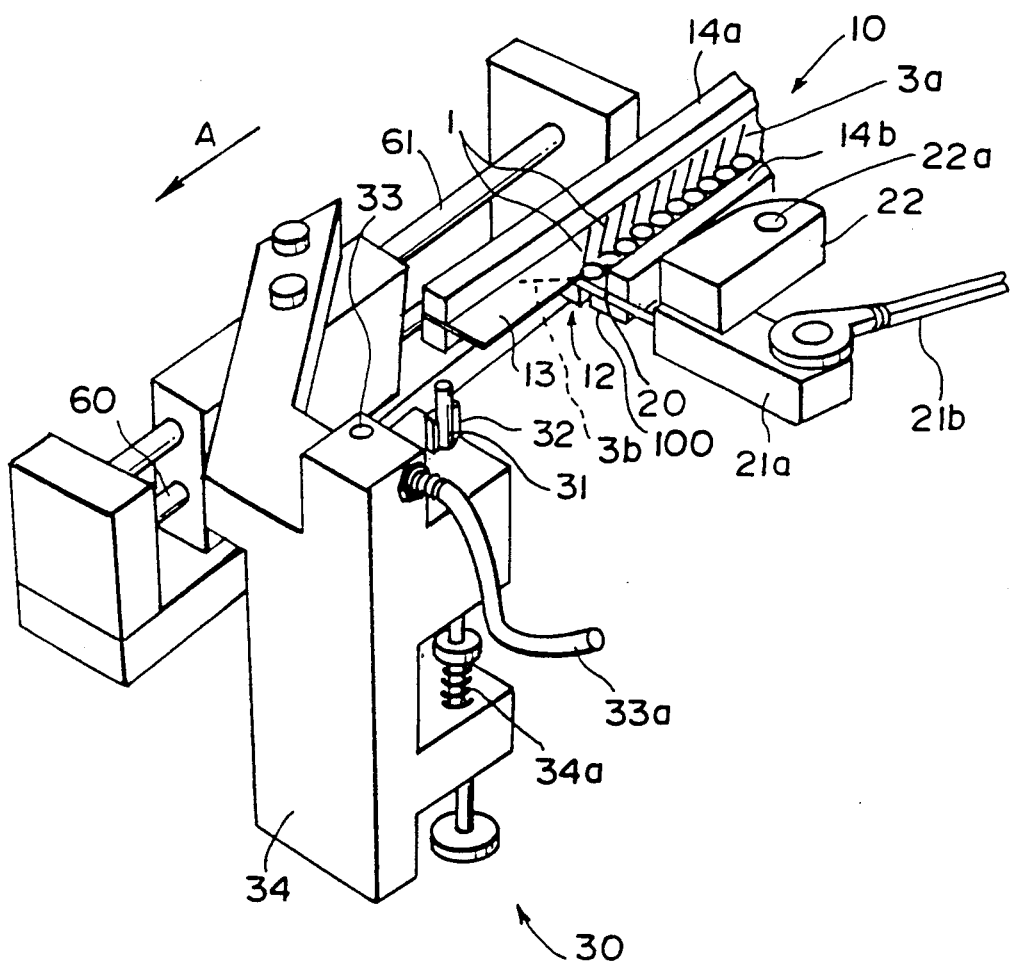
FIG. 1 is a fragmentary perspective view of a torsion spring conveying and separating system in accordance with an embodiment of the present invention.

In FIG. 1, the torsion spring conveying and separating system of this embodiment comprises a linear vibrating feeder 10 for conveying a plurality of α-shaped torsion springs 1 and an escapement mechanism 30 for separating the α-shaped torsion springs 1 one by one. The leading one of the α-shaped torsion springs 1 conveyed by the linear vibrating feeder 10 is separated from the trailing ones at the front end of the linear vibrating feeder 10 by the escapement mechanism 30, and is picked up by a chucking mechanism 40.

Figure 2:
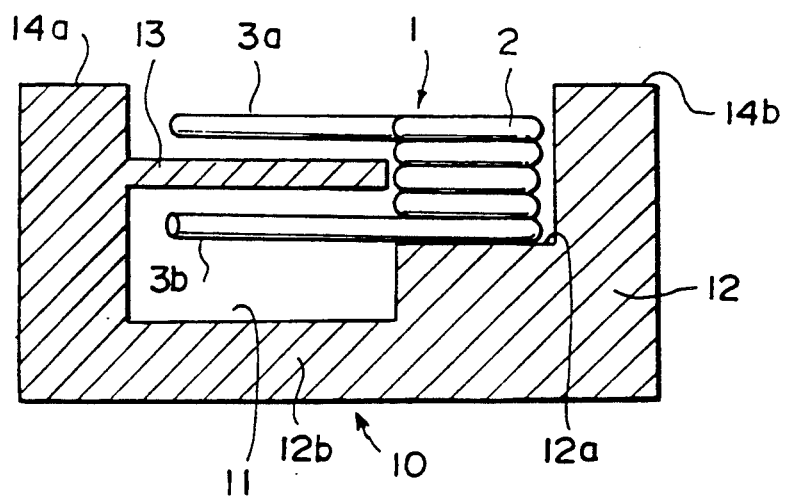
FIG. 2 is a fragmentary cross-sectional view of the system.

The linear vibrating feeder 10 has conveyor rail 12 which is substantially channel-shaped in cross-section opening upward. As shown in FIG. 2, the conveyor rail 12 has a base wall portion 12b and first and second side wall portions 14a and 14b which extend upward on opposite sides of the base wall portion 12b. The base wall portion 12b has an elevated portion 12a adjacent to the second wall portion 14b and as a result, a recess 11 is formed adjacent to the first side wall portion 14a. A partition wall portion 13 horizontally projects toward the second side wall portion 14b from an intermediate portion of the first side wall portion 14a and terminates substantially above the shoulder between the elevated portion 13 and the recess 11. As shown in FIG. 1, the first side wall portion 14a and the partition wall portion 13 extends forward beyond the front ends of the second side wall portion 14b and the base wall portion 12b. When the α-shaped torsion springs 1 are conveyed by the linear vibrating feeder 10, each spring 1 is placed on the conveyor rail 12 so that the coiled portion 2 rests on the elevated portion 12a of the base wall portion 12b and the leg portions 3a and 3b extend toward the first side wall portion 14a respectively above and below the partition wall portion 13.

The α-shaped torsion springs 1 are conveyed along the conveyor rail 12 while the position of each α-shaped torsion spring 1 is regulated by the first and second side wall portions 14a and 14b and the coiled portion 2 of each spring 1 is held by the edge of the partition wall portion 13 and the second side wall portion 14b. The partition wall portion 13 which extends between the leg portions 3a and 3b of each α-shaped torsion spring 1 prevents the spring 1 from falling, and keeps the tips of the respective leg portions 3a and 3b away from the first side wall portion 14a. Further the recess 11 below the leg portion 3b keeps the leg portion 3b away from the base wall portion 12b even if the leg portion 3b is in curl. Accordingly, the α-shaped torsion springs 1 can be conveyed along the conveyor rail 12 in a predetermined position and the linear vibrating feeder 10 cannot be jammed even if the angle between the leg portions 3a and 3b varies from spring to spring or the leg portions 3a and 3b are in curl.

Figure 4A:
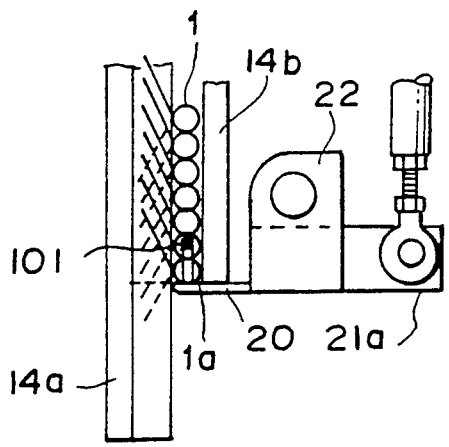
FIG. 4A is a fragmentary plan view for illustrating the operation of the system.

At the front end of the base wall portion 12b and the second side wall portion 14b, the leading spring 1a is stopped by a first stopper pin 20 as shown in FIG. 4A. The leading spring 1a is separated from the trailing springs by escapement mechanism 30 in the following manner.

The escapement mechanism 30 comprises a carriage 34, a first stopper pin block 21a on which the first stopper pin 20 is provided and a second stopper pin block 100 on which a second stopper pin 101 (FIGS. 5A to 5C) is provided. The first stopper pin block 21a is disposed on one side of the second side wall portion 14b of the conveyor rail 12 and is supported for rotation about a shaft 22a by way of a block 22. The first stopper pin block 21a is rotated back and forth about the shaft 22a by a lever 21b so that the first stopper pin 20 is moved between the operative position shown in FIG. 1 where it stops the leading spring 1 and a retracted position away from the conveyor rail 12. The carriage 34 is provided with a coil support 32 and an escape pin 31. Further a suction hole 33 which is connected to a vacuum source (not shown) by way of a suction hose 33a is formed in the top surface of the carriage 34. The carriage 34 is movable back and forth along shafts 60 and 61 in the direction parallel to the spring conveying direction (the direction of arrow A) and is movable back and forth. The escape pin 31 is supported on the carriage 34 and is movable up and down relative to the carriage 34. The escape pin 31 is urged upward by a compression spring 34a.

The operation of the escapement mechanism 30 will be described with reference to FIGS. 5A to 5C, hereinbelow.

Figure 3:
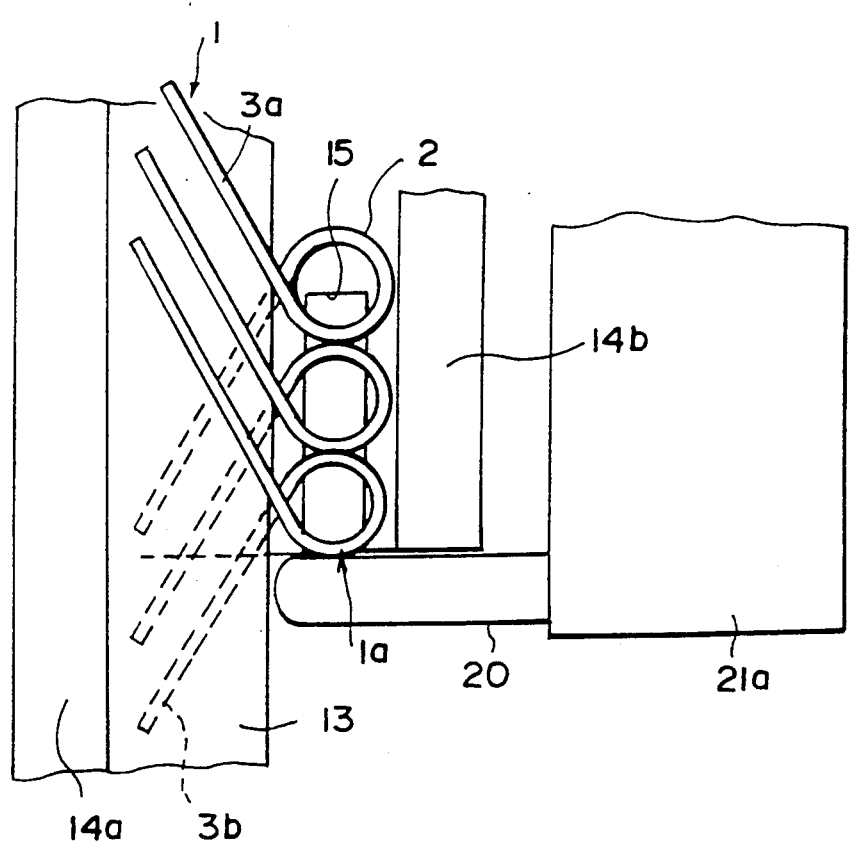
FIG. 3 is a fragmentary plan view of the system.
Figure 5A:
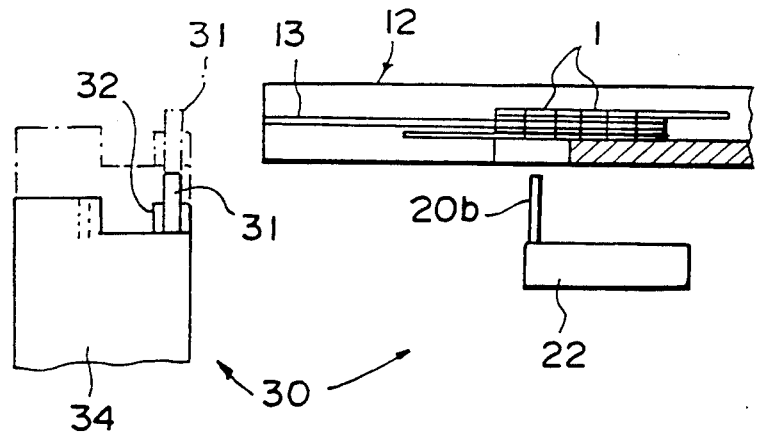
FIGS. 5A to 5C are fragmentary side views for illustrating the operation of the system.
Figure 5B:
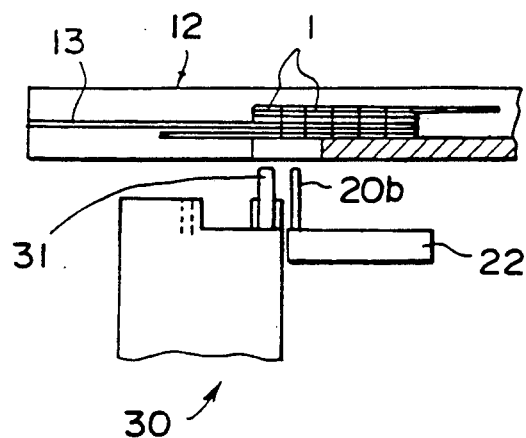
Figure 5C:
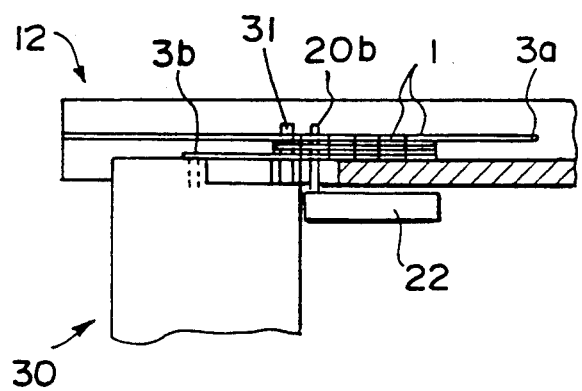

First the carriage 34 and the second stopper pin block 100 are moved below the conveyor rail 12 as shown in FIG. 5A. Then the carriage 34 is slid along the shafts 60 and 61 to a position in which the escape pin 31 is aligned with the hole 2a of the coiled portion 2 of the leading spring 1 as shown in FIG. 5B. At the same time, the second stopper pin block 100 is moved to a position in which the second stopper pin 101 is aligned with the hole 2a of the coiled portion 2 of the second leading spring. As shown in FIG. 3, the elevated portion 12a of the base wall portion 12b of the conveyor rail 12 is provided with an slit 15 near the front end portion thereof and the holes 2a of the coiled portions 2 of the leading spring 1a and the second leading spring are positioned above the slit 15.

The carriage 34 and the second stopper pin block 100 are then moved upward so that the escape pin 31 is inserted into the hole 2a of the coiled portion 2 of the leading spring 1 and the second stopper pin 101 is inserted into the hole 2a of the coiled portion 2 of the second leading spring. The carriage 34 is stopped when the top surface of the coil support 32 abuts against the lower surface of the coiled portion 2.

Figure 4B:
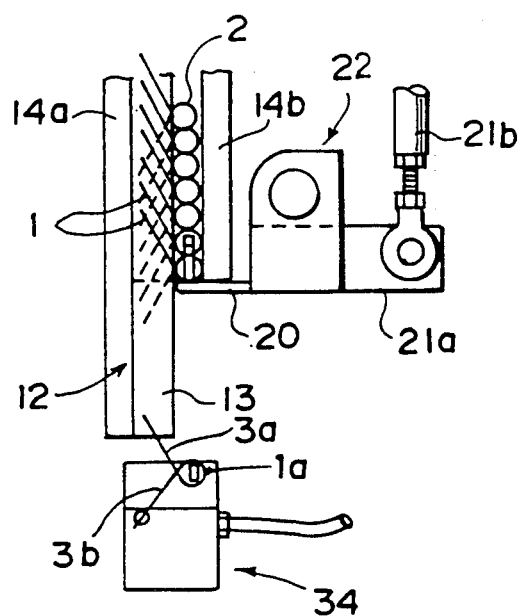
FIG. 4B is a fragmentary plan view for illustrating the operation of the escapement mechanism employed in the system.
Figure 4C:
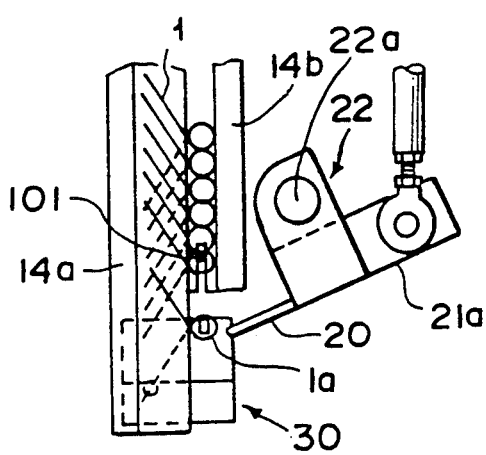
FIG. 4C is fragmentary plan view showing the escapement mechanism in one state.

When the escape pin 31 is inserted into the coiled portion 2, vacuum is supplied to the suction hole 33 which is positioned below the leg portion 3b and the leg portion 3b is sucked against the top surface of the carriage 34, whereby the position of the spring 1a on the coil support 32 is regulated. Then the first stopper pin 20 is moved from the operative position shown in FIG. 4A to the retracted position shown in FIG. 4B. Thereafter the carriage 34 is moved in the direction of arrow A drawing the leading spring 1a to a chucking position shown in FIG. 4C. While the leading spring 1a is drawn to the chucking position, the leg portion 3a slides along the upper surface of the partition wall portion 13, and the leg portion 3a is still on the partition wall portion 13 even when the leading spring 1a is in the chucking position, and accordingly, the spring 1a can be held in an optimal position.

Figure 6:
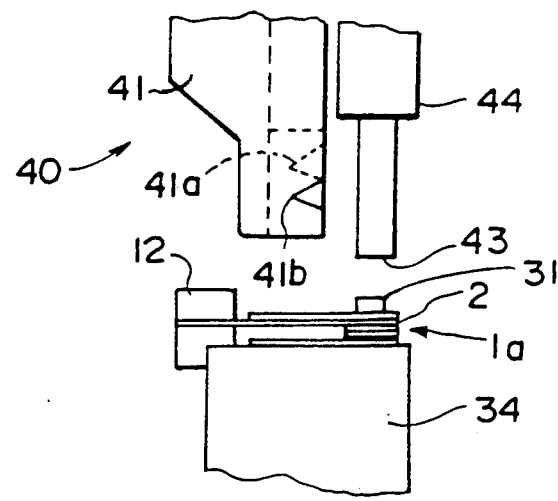
FIG. 6 is a fragmentary side view showing the chucking mechanism employed in the system.

As shown in FIG. 6, the chucking mechanism 40 has a center pin 43 and chucking claw 41 and is movable up and down. The chucking mechanism 40 is disposed above the chucking position shown in FIG. 4C and the center pin 43 is aligned with the escape pin 31 when the carriage 34 is in the chucking position. The chucking claw 41 has a pair of V-shaped grooves 41a and 41b for catching the spring 1a at the middle of the leg portions 3a and 3b.

Figure 7:
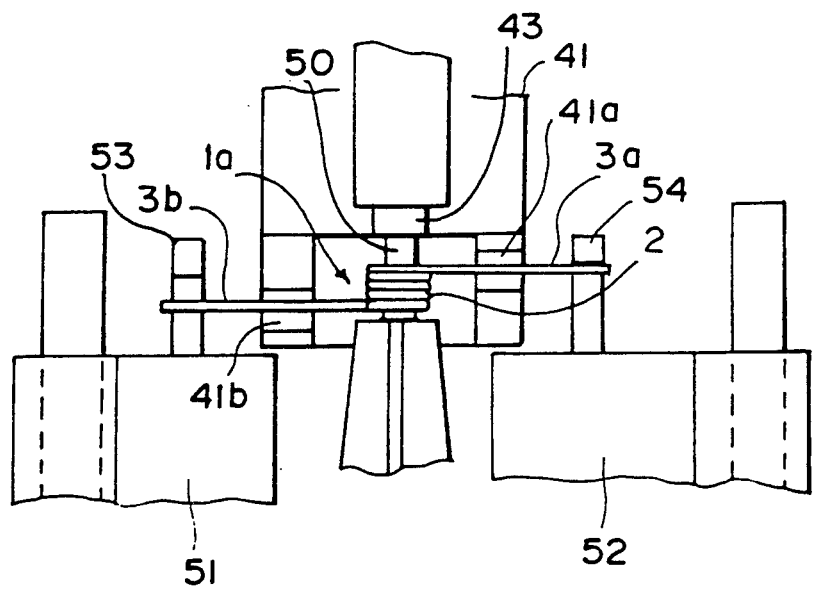
FIG. 7 is a fragmentary side view for illustrating the operation of the system.

The chucking mechanism 40 is moved downward until the bottoms of the V-shaped grooves 41a and 41b are at the same height as the leg portions 3a and 3b respectively. The escape pin 31 is moved downward by a driving means (not shown) immediately before the lower end of the center pin 43 abuts against the upper end of the escape pin 31. Thereafter, the chucking claw 41 is moved, for instance, by an air cylinder (not shown) toward the center pin 43 so that the leg portions 3a and 3b are respectively inserted into the grooves 41a and 41b, thereby chucking the spring 1a under the resiliency of the leg portions 3a and 3b. After chucking the spring 1a, the chucking mechanism 40 is moved upward and then moved horizontally to a spring incorporating position where a lower cassette half having a spring support pin 50 and brake levers 51 and 52 is positioned as shown in FIG. 7. The brake levers 51 and 52 are respectively provided with hook portions 53 and 54. In the spring incorporating position, the center pin 43 is vertically aligned with the spring support pin 50. The center pin 43 is supported by a pin support 44 to be movable up and down relative to the pin support 44 and is urged downward by a spring (not shown). The chucking claw 41 and the pin support 44 of the chucking mechanism 40 are moved downward toward the lower cassette half. As the chucking claw 41 and the pin support 44 of the chucking mechanism 40 are moved downward, the lower end of the center pin 43 abuts against the upper end of the spring support pin 50 and the center pin 43 is pushed upward relative to the pin support 44. Accordingly, the coiled portion 2 of the spring 1a is removed from the center pin 34 and fitted on the spring support pin 50 as the chucking claw 41 and the pin support 44 are moved downward. The chucking claw 41 and the pin support 44 are stopped when the leg portions 3a and 3b held by the grooves 41a and 41b of the chucking claw 41 are moved below the hook portions 53 and 54 of the brake levers 51 and 52. Then the chucking claw 41 is horizontally moved away from the center pin 43 to release the leg portions 3a and 3b, whereby the leg portions 3a and 3b are engaged with the hook portions 53 and 54 under the resiliency thereof. Finally the chucking claw 41 and the pin support 44 are moved upward leaving the spring 1a on the lower cassette half.

While the chucking mechanism 40 incorporates a spring 1 into the lower cassette half, the escapement mechanism 30 separates another spring.

Though, in the embodiment described above, the escape pin 31 is moved downward immediately before the lower end of the center pin 43 abuts against the upper end of the escape pin 31 by a driving means which is not shown, the driving means may be eliminated when the compression spring 34a which urges upward the escape pin 31 is sufficiently weaker than the spring which urges downward the center pin 43.

I claim:

1. A torsion spring conveying and separating system comprising a linear vibrating feeder which conveys a plurality of α-shaped torsion springs along a conveyor rail extending in a predetermined direction and an escapement mechanism which separates the leading one of the α-shaped torsion springs from the trailing ones at the front end of the conveyor rail, each of the α-shaped torsion springs having a cylindrical coiled portion and first and second leg portions projecting from opposite ends of the coiled portion, said torsion spring conveying and separating system characterized in that said conveyor rail comprises a base wall portion extending horizontally in said predetermined direction, first and second side wall portions which project upward on opposite sides of the base wall portion and extend in the predetermined direction substantially in parallel to each other, a coil support surface which projects horizontally above the base wall portion from the second side wall portion toward the first side wall portion and terminates at a free edge spaced from the first side wall portion, and a partition wall portion which projects horizontally above the base wall portion from the first side wall portion toward the second side wall portion and terminates near the free edge of the coil support surface above the same, said α-shaped torsion spring being conveyed along the conveyor rail with the coiled portion resting on the coil support surface in a vertical position, the first leg portion projecting above the partition wall portion and the second leg portion projecting below the partition wall portion and being spaced from the base wall portion, the edge of the partition wall portion opposed to the second side wall portion preventing the leg portions from interfering with the first side wall portion during conveyance, and said escapement mechanism comprises an escape pin member which is inserted into the coiled portion of the leading one of the α-shaped torsion springs conveyed along the conveyor rail and a suction means which holds the second leg portion of the leading one of the α-shaped torsion springs under suction force, the escape pin member and the suction means being movable together with each other in the predetermined direction to draw forward the leading one of the α-shaped torsion springs, thereby separating it from the trailing α-shaped torsion springs.

2. A torsion spring conveying and separating system as defined in claim 1 in which said partition wall portion has an extension which projects forward beyond the front end of the conveyor rail and said escapement mechanism draws the leading one of the α-shaped torsion springs along the extension to separate it from the trailing ones.

3. A torsion spring conveying and separating system as defined in claim 2 in which said escapement mechanism further comprises a first stopper pin which stops the leading one of the α-shaped torsion springs at the front end of the conveyor rail and is movable away from the conveyor rail to permit the leading one to be drawn out of the conveyor rail.

4. A torsion spring conveying and separating system as defined in claim 3 in which said escapement mechanism further comprises a second stopper pin which is inserted into the coiled portion of the second leading one of the α-shaped torsion springs and holds it when the leading one is drawn out of the conveyor rail.

* * * * *